(12) United States Patent
Chen et al.

(10) Patent No.: US 6,365,877 B1
(45) Date of Patent: Apr. 2, 2002

(54) BLACKBODY FURNACE

(75) Inventors: Jack Chen, Taipei; John Lin, Hsinchu, both of (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 0 days.

(21) Appl. No.: 09/739,588

(22) Filed: Dec. 18, 2000

(30) Foreign Application Priority Data

Nov. 7, 2000 (TW) ..................................... 89219409 U

(51) Int. Cl.[7] .............................. F27B 5/16; F27B 17/00; F27D 7/04
(52) U.S. Cl. ..................... 219/400; 219/407; 373/111; 373/113
(58) Field of Search ................................ 219/400, 390, 219/407, 44; 250/252.1; 373/111, 113, 135, 136; 374/2; 392/416

(56) References Cited

U.S. PATENT DOCUMENTS

| | | | | |
|---|---|---|---|---|
| 5,608,838 A | * | 3/1997 | Brookley | ..................... 392/416 |
| 6,111,227 A | * | 8/2000 | Cress | ......................... 219/400 |
| 6,179,465 B1 | * | 1/2001 | Yam | ............................... 374/2 |
| 6,232,614 B1 | * | 5/2001 | Christy et al. | .......... 250/504 R |

FOREIGN PATENT DOCUMENTS

| | | | |
|---|---|---|---|
| JP | 60-262914 | * | 12/1985 |
| JP | 7-270256 | * | 10/1995 |
| JP | 9-079911 | * | 3/1997 |

* cited by examiner

*Primary Examiner*—Joseph Pelham
(74) *Attorney, Agent, or Firm*—Ladas & Parry

(57) ABSTRACT

A blackbody furnace, mainly comprising a radiation cavity, a thermally insulating layer, a heater, a housing, a temperature controller, an airflow controller and a high-pressure air source. Besides, a gas channel is provided at the bottom of the radiation cavity to conduct the interior of the furnace chamber with the exterior. In the process of lowering the temperature of the blackbody furnace, the airflow controller could be actuated by the temperature controller or by an operator. Therefore, the room-temperature high-pressure air will enter the radiation cavity through the gas channel to fast cool down the radiation cavity. Finally, heat air will be vented from an opening at the front end of the radiation cavity. The present invention utilizes forced convection to enhance the efficiency of heat dissipation to fast lower the temperature of the blackbody furnace.

3 Claims, 3 Drawing Sheets

BLACKBODY FURNACE

BACKGROUND OF THE INVENTION

1. Field of the Invention

The present invention relates to a blackbody furnace, and particularly to a blackbody furnace for lowering its temperature fast.

2. Description of Related Art

A blackbody furnace is an important apparatus in the industry for calibrating an infrared thermometer and thermal image instrument. The furnace comprises a radiation cavity, heater, thermally insulating layer, housing, temperature controller, airflow controller and high-pressure air source. The radiation cavity is a radiation source of the blackbody furnace. The radiative intensity and wavelength of the radiation source is relevant to the temperature by itself, and the relation could be described by Planck's law. The heater is mainly used to heat the radiation cavity. The thermally insulating layer is used to reduce heat dissipation from the heater to the housing, thereby reducing heat loss, enhancing thermal efficiency and reducing power consumption. From the viewpoint of the temperature increase of the blackbody furnace, a thermally insulating layer having a good heat isolation is a better choice. However, from the viewpoint of the temperature decrease of the blackbody furnace, a thermally insulating layer having a good heat isolation will cause the temperature of the furnace to lower at a very low speed, especially when the temperature of the blackbody furnace is near the room temperature. Therefore, the prior blackbody furnace has a common characteristic that the speed to lower the temperature (when the temperature is under 150° C.) is low. It is well known that the optimal control parameters (proportion, integration, differential) of the temperature controller are different at a high temperature region, middle temperature region and low temperature region. Therefore a temperature overshooting often occurs. If a temperature overshooting occurs at a low temperature region, or the temperature setting is changed to a value lower than furnace temperature, a user always needs to wait for a long time until the blackbody furnace reaches a desired temperature.

SUMMARY OF THE INVENTION

Accordingly, an object of the present invention is to propose a blackbody furnace for lowering its temperature fast. Besides, the speed at which the temperature of the furnace of the present invention increase is faster than that of a prior blackbody furnace.

For raising the stability to control the temperature, the material of the radiation cavity of the blackbody furnace is commonly selected from materials of large enthalpy or a large thermal mass. Therefore, the radiation cavity is the component having the largest thermal mass in the blackbody furnace, and is placed in the center of the blackbody furnace. Since a thermally insulating layer is used to surround the radiation cavity, in the process of lowering the temperature, the heat induced in the radiation cavity is difficult to dissipate from side walls of the blackbody furnace. In other words, most heat will dissipate from an opening at the front side by radiation. According to Stefan Boltzmann Law, the total energy of heat radiation is proportional to an absolute temperature to the power of four. The more the temperature is, the stronger the radiation energy is. Therefore, the dissipation from the opening of the blackbody furnace is little at the low temperature region, and that is why the prior blackbody furnace has a low speed to lower the temperature at the low temperature region.

Ways to transfer heat has heat conduction, heat convection and heat radiation. As mentioned above, the effect of heat conduction is poor due to the thermally insulating layer, and the heat radiation is also poor at the low temperature region. Therefore, the optimal way to dissipate heat is heat convection. There is an air channel at the bottom of the radiation cavity of the blackbody furnace of the present invention to conduct the interior of the radiation cavity with the exterior. The air channel is connected to a high-pressure air source through an airflow controller. In the process of lowering the temperature of the blackbody furnace, an airflow controller will be actuated by a temperature controller or operated by an operator, and a high-pressure air will enter the radiation cavity through the air chamber for reducing the temperature of the radiation cavity. Finally, the hot air will be vented from the opening. The present invention enhances the efficiency of the heat dissipation by forced convection to achieve the purpose of fast lowering the temperature of the blackbody furnace.

A further object of the present invention is to save power. The heat-isolation effect of the thermally insulating layer will not affect the speed of lowering the temperature, and the heat loss of the present invention is less than that of prior arts in the process of heating. Therefore, the speed at which the temperature increases will be faster than that of prior arts.

A still further object of the present invention is to improve the temperature uniformity of the radiation cavity of the blackbody furnace. Although the heat isolation effect of the thermally insulating layer will not obviously affect the speed of lowering the temperature, the temperature gradient between the middle section and one of two ends of the radiation cavity in the blackbody furnace will be reduced, thereby improving the temperature uniformity of the radiation cavity of the blackbody furnace.

The opening of the air channel of the blackbody furnace of the present invention is situated at the intersection of a side wall of the radiation cavity and the bottom of the radiation cavity, the change on emissivity can be neglected.

BRIEF DESCRIPTION OF THE DRAWINGS

The present invention will be described in conjunction with the appended drawings, in which.

DETAILED DESCRIPTION OF THE PRESENT INVENTION

Figure 1:
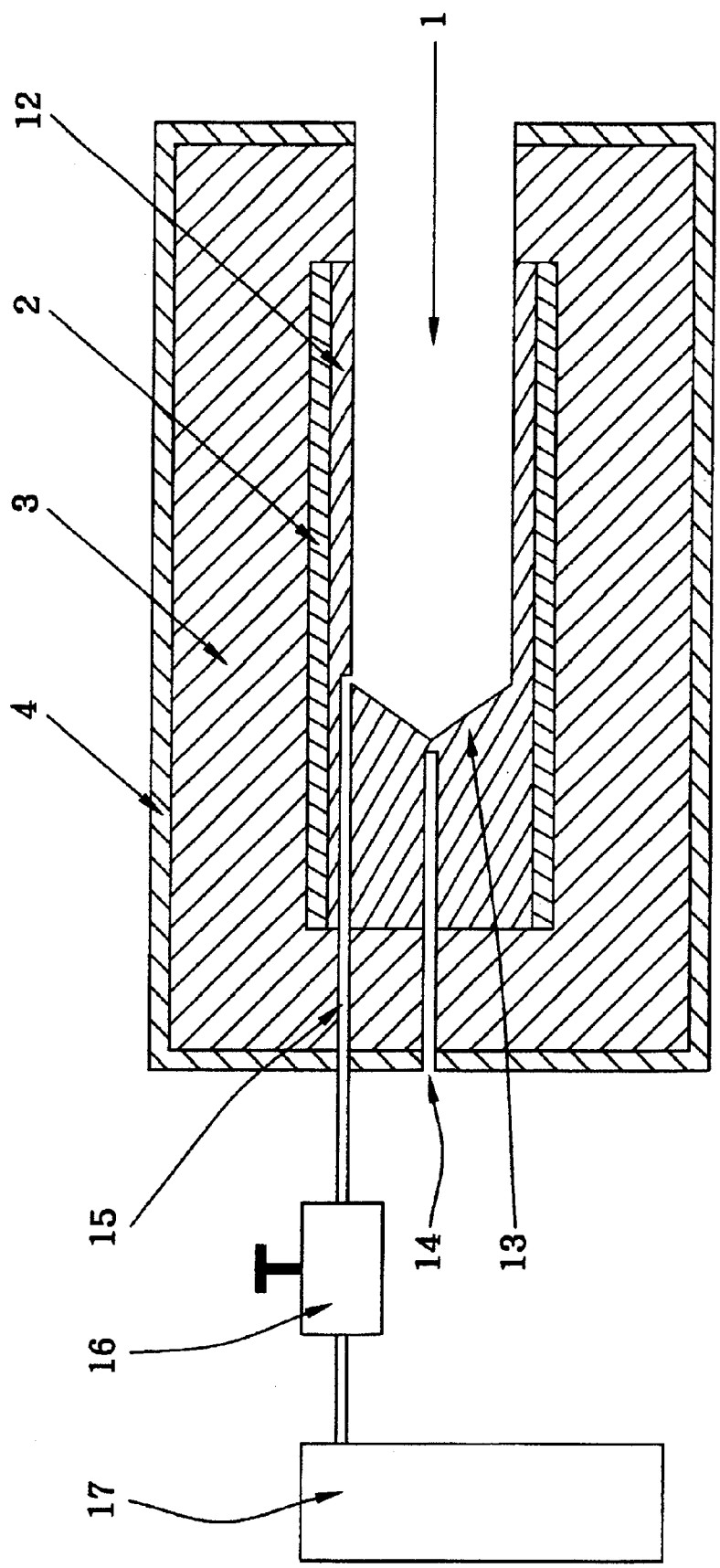
FIG. 1 is a cross-sectional view of a blackbody furnace according to the present invention.
Figure 2:
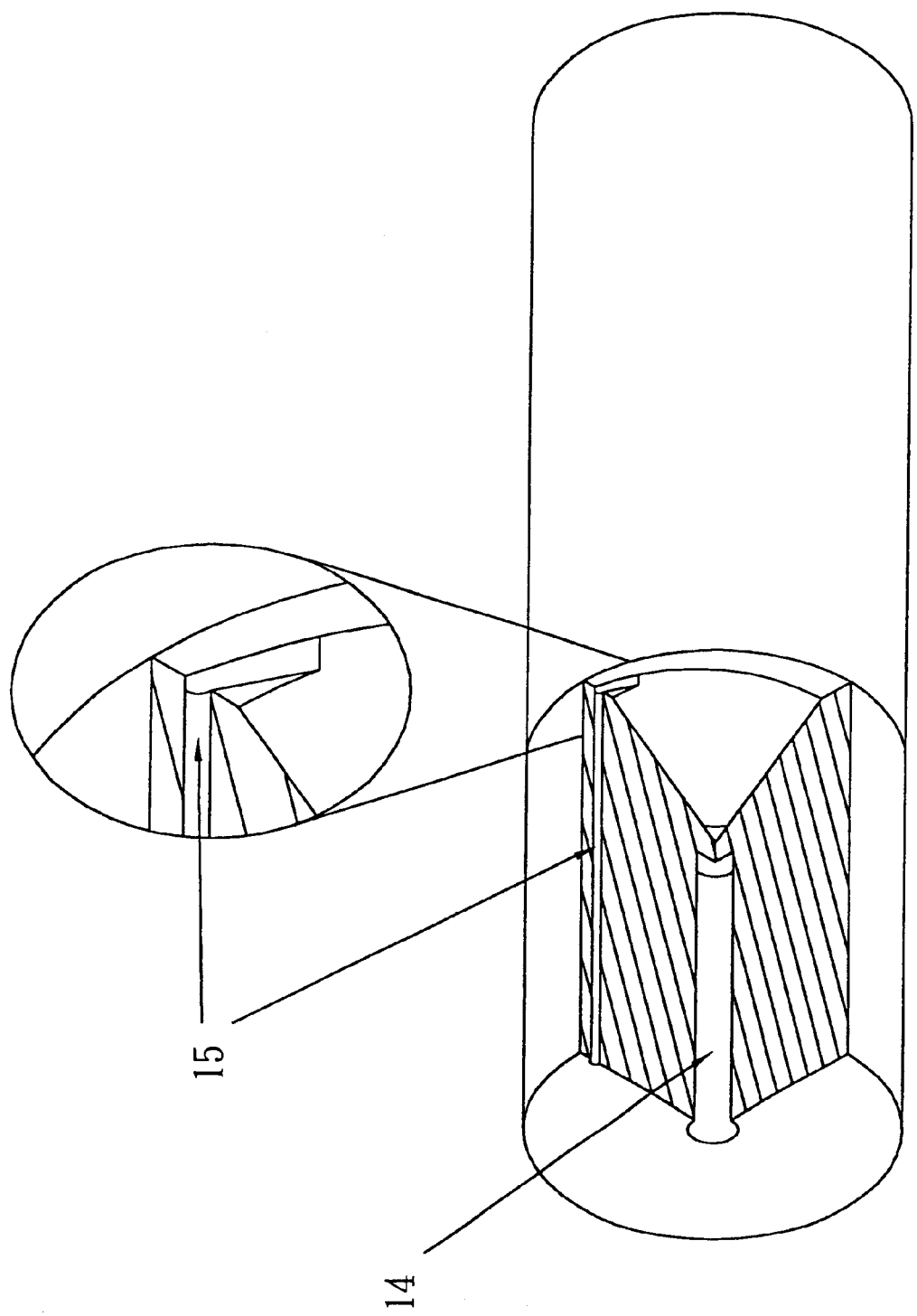
FIG. 2 is a cross-sectional view of the radiation cavity of a blackbody furnace according to the present invention.

FIG. 1 is a cross-sectional view of a blackbody furnace according to the present invention. The blackbody furnace comprises a radiation cavity 1, a heater 2, a thermally insulating layer 3, a housing 4, a temperature controller (not shown), an airflow controller 16 and a high-pressure air source 17. A gas channel 15 is provided at the bottom 13 of the radiation cavity 1 for communicating the interior of the radiation cavity 1 with the exterior. The air channel 15 has a 90-degree corner inside the radiation cavity 1, and the direction of an exit is a tangent line of a side wall 12 in the radiation cavity. Therefore, when a cold air from a high-pressure air source enters of the radiation cavity, as shown in FIG. 2, a spiral airflow is formed in the radiation cavity 1 to allow the cold air to have more time to absorb the heat energy in the radiation cavity 1 and raises the efficiency of a heat convection. The airflow controller can be controlled by an output signal from a deviation alarm of the temperature controller. When the temperature of the blackbody furnace is over a default value of the furnace too much (over the default value of the alarm), the output signal of the deviation alarm will actuate the airflow controller to let the high-pressure air enter of the radiation cavity 1. In the embodiment, the default value of the deviation alarm is +2° C., the diameter of the air channel 15 is 2 mm, and the pressure of the high-pressure air source is 1 Kg/mm$^2$. As far as the time for lowering temperature from 100° C. to 50° C. is concerned, 265 minutes will be needed if the airflow controller is turned off (simulating prior blackbody furnace), and 50 minutes will be needed if the airflow controller is turned on (simulating the blackbody furnace of the present invention).

Figure 3:
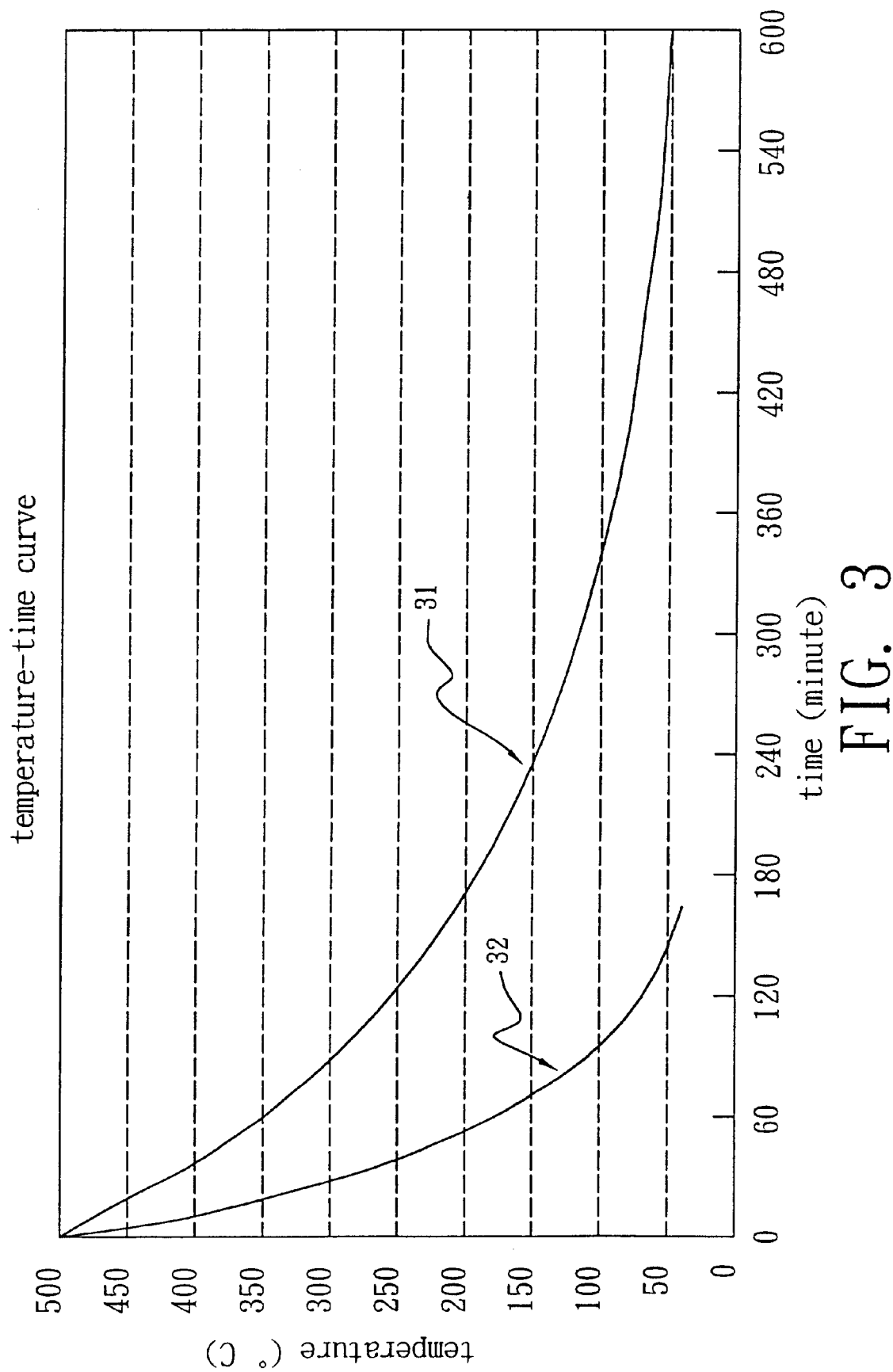
FIG. 3 is a temperature v.s. time curve of the present invention.

FIG. 3 is a temperature v.s. time curve of the present invention, wherein a curve 31 represents heat dissipation by nature and a curve 32 represents heat dissipation by convection. It is easy to find that the effect of lowering the temperature is remarkable.

The above-described embodiments of the present invention are intended to be illustrative only. Numerous alternative embodiments may be devised by those skilled in the art without departing from the scope of the following claims.

What is claimed is:

1. A blackbody furnace, comprising:

a radiation cavity situated at the center of said blackbody furnace to generate a heat radiation; and having an air channel at the bottom of said radiation cavity to communicate the interior of said radiation cavity with the exterior;

a heater surrounding said radiation cavity to heat said radiation cavity;

a thermally insulating layer surrounding said heater to keep the furnace warm and reduce heat loss;

a housing encapsulating said thermally insulating layer to enhance a sense of beauty;

an airflow controller communicated with the air channel and a high-pressure air source to control the airflow;

a high-pressure air source connected to said airflow controller to provide a high-pressure air to cool down said radiation cavity; and a temperature controller for controlling heating power of said heater;

wherein said air channel is used to communicate the interior of said radiation cavity with the exterior, and when temperature is lowered, the high-pressure air enters the radiation cavity through said air channel and dispels hot air in the radiation cavity by forced convection to increase the speed of lowering the temperature.

2. The blackbody furnace of claim 1, wherein said airflow controller is controlled by said temperature controller.

3. The blackbody furnace of claim 1, wherein the high-pressure air enters the radiation cavity along a tangent line of its side wall in said radiation cavity to form a spiral airflow for raising a heat exchange efficiency.

* * * * *